2,706,246

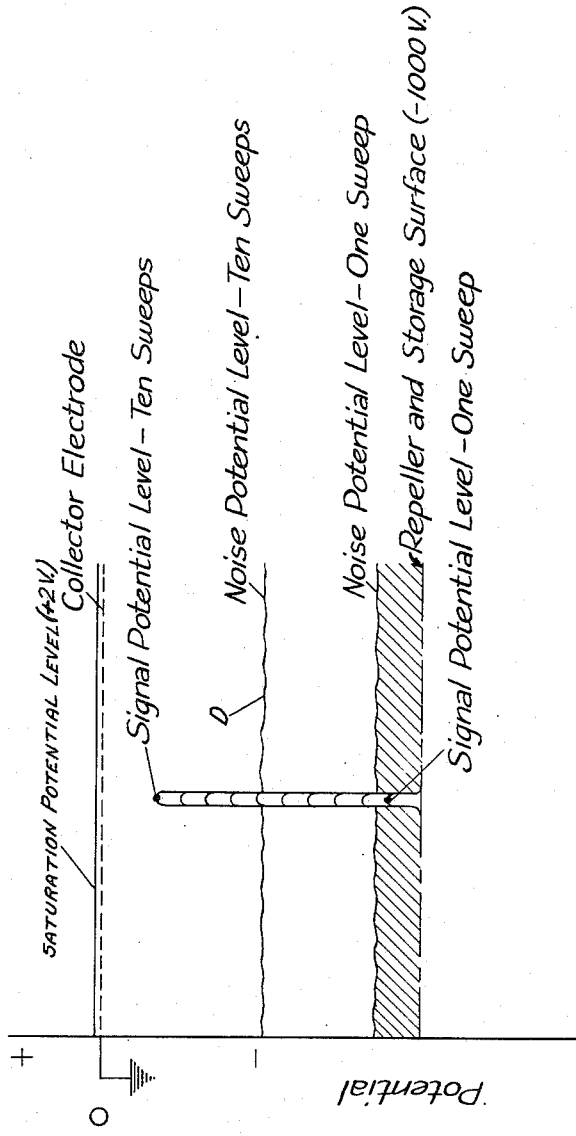
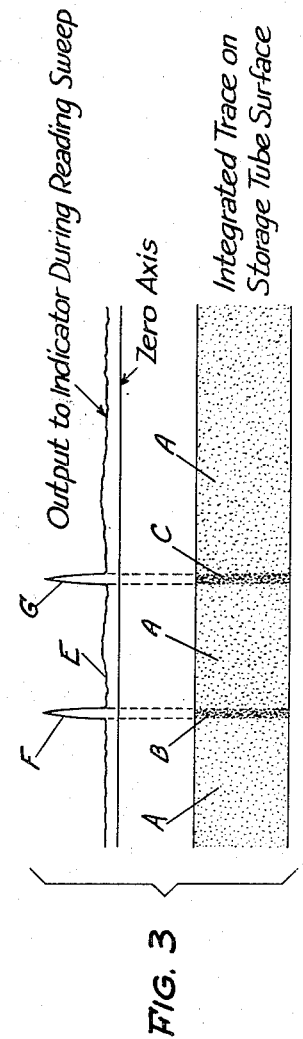
FIG. 2
FIG. 3
INVENTOR
HANS KLEMPERER
BY
ATTORNEY

BEAM TUBE STORAGE SYSTEM

Hans Klemperer, Belmont, Mass., assignor to Raytheon Manufacturing Company, Newton, Mass., a corporation of Delaware Application February 11, 1948, Serial No. 7,645

5 Claims. (Cl. 250—27)

This invention relates to electrical circuits, and more particularly to a circuit by means of which a periodically-recurring weak signal can be detected when mixed with, and can be segregated from, a non-periodic background wave which is of larger amplitude.

In substantially all electrical circuits using electron discharge tubes, the factor which establishes a minimum signal amplitude level below which signals cannot be detected is the noise level inherent in the overall system; that is to say, if a signal has an amplitude or strength which is lower than that of the overall inherent system noise, such a signal cannot ordinarily be detected no matter to what extent it is amplified, since the noise is also amplified an equal amount and will continue to overshadow or cover up even the amplified signal.

Heretofore, in order to detect weaker and weaker signals mingled with inherent noise, it has been necessary to increase the power expenditure of the signal transmitting station, in order to raise the level of the signal as received at the signal receiving or detecting station above the inherent overall noise level of the components of the latter station. This procedure is wasteful.

Therefore, an object of the present invention is to devise a circuit by means of which a weak input signal, one which is below the overall noise level of a signal receiving station, may be detected.

Another object is to accomplish the aforesaid object without the necessity of increasing the power expended, thereby enabling the same system sensitivity to be obtained with a reduction of power as compared to previous systems or circuits.

A further object is to provide means for detecting a periodically-recurring weak signal in the presence of a non-periodic background wave of larger amplitude.

The foregoing and other objects of the invention will be best understood from the following description of an exemplification thereof, reference being had to the accompanying drawings, wherein:

Fig. 2 is a charge-potential diagram useful in explaining the operation of the invention; and Fig. 3 is a pair of patterns useful in explaining the operation of the invention.

Figure 1:
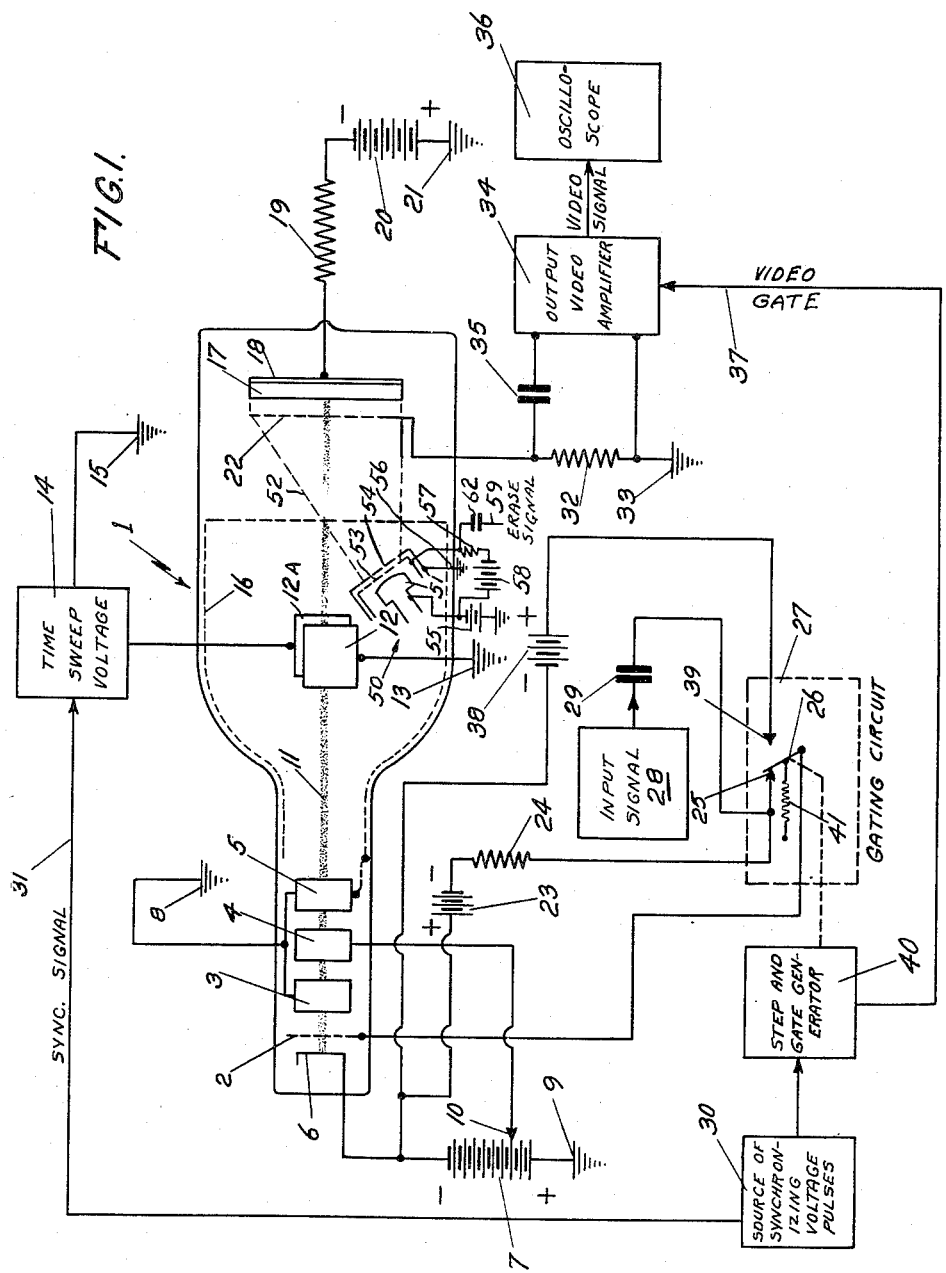
Fig. 1 is a diagrammatic representation of a system embodying the invention.

Now referring to the drawings, and more particularly to Fig. 1 thereof, reference numeral 1 generally designates a storage tube of the type disclosed in my copending application, Ser. No. 787,873, filed November 25, 1947. Such a tube is, according to the invention, utilized in connection with the visual reproduction or detection of a periodically-recurring weak signal in the presence of an aperiodically-occurring or random stronger signal, such as noise. It is to be understood that this invention is applicable to the detection of periodically-recurring sub-noise electrical signals of many different kinds and from many different sources. For purposes of illustration, but not for limiting this invention thereto, the invention will be disclosed in connection with the detection of a sub-noise signal due to the presence of a target in a given area scanned by a system employing electromagnetic signal reflection methods, or in connection with a radar system.

As used herein, the term "sub-noise signal" refers to a signal having an amplitude which is below or less than that of the noise level inherent in the electronic portions of the detecting and amplifying system.

Mounted in the narrow end of the envelope of tube 1 is an electron gun comprising a control grid 2, first, second and third anodes 3, 4 and 5, respectively, and a cathode 6 for producing the necessary electron population when suitably energized. A source of potential 7 provides the necessary focusing and accelerating potentials to the anodes 3–5, in a manner familiar to those versed in the art pertaining to this type of electron discharge device. Thus, anodes 3 and 5 are grounded at 8, the positive terminal of source 7 being grounded at 9 and the negative end of said source being connected directly to cathode 6. Anode 4 is connected by means of tap 10 to an intermediate point on source 7. Under these conditions of energization, provided that cathode 6 is heated by any suitable means (not shown) and provided that control grid 2 is not biased negatively beyond beam cutoff, an electron stream 11 is projected from cathode 6 toward the right through anodes 3–5 along the axis of the envelope toward the enlarged right-hand end thereof.

A pair of vertical deflecting plates 12 and 12A is mounted in the envelope to the right of anode 5 in a position to act on the stream 11. Plate 12 is grounded as at 13, one output terminal of a synchronizable source 14 of time sweep voltage being also grounded as at 15. Plate 12A is connected to the other output terminal of source 14, so that stream 11 is deflected horizontally back and forth in synchronism with the output voltage of source 14 in a manner familiar to those skilled in the art of cathode ray oscillography. Suitable focusing coils (not shown) are preferably provided in order to focus stream 11 into an electron beam of substantially rectangular cross-section. A conductive coating 16 inside the tube envelope is grounded by being connected to anode 5 and serves to electrically shield the electron beam represented by 11.

Disposed at the enlarged end of the tube envelope opposite from cathode 6, in the path of projection of beam 11, is a potential storing target surface 17. This electrode 17 is a plate of electrically insulating or non-conducting material, such as glass, and is backed by a conductive coating 18 which serves as the so-called repeller electrode and by means of which a negative bias voltage may be applied to surface 17 to bias said surface negatively with respect to ground. In order to so bias said surface, coating 18 is connected through a resistor 19 of high resistance to the negative terminal of a source of potential 20, the positive terminal of which is grounded at 21. The potential of source 20 is preferably on the order of 500 to 1000 volts. Electrode 17 is a substantially planar surface, the plane of said electrode lying at substantially right angles to the axis of beam 11, as shown.

An electrode 22 is substantially planar and is parallel to electrode 17, being spaced from said electrode and in front of the same. Electrode 22 is preferably constructed of nickel wire of very small diameter in the form of a 100-mesh screen and is disposed perpendicularly to electron beam 11, said electron beam passing through screen electrode 22 and impinging on the electrode 17.

Control grid 2 may be used to control the intensity of the electron beam 11 or to control the beam current of said beam, and in this invention the signals to be detected are applied to this grid to modulate the intensity of the said beam in accordance with the signals to be detected. In order to provide a low predetermined rest or no-signal intensity of the electron beam 11, a fixed negative potential bias is applied to grid 2 during the writing operations. The positive side of a source 23 of bias potential is connected to cathode 6, the negative side of said source being connected through a resistor 24 and a fixed contact 25 and the movable contact 26 of a gating circuit or controllable switch 27 (when said switch has the position illustrated) to grid 2; by this means grid 2 is negatively biased during the writing operations of the beam.

In order to modulate or vary the intensity of the electron beam 11 from its predetermined rest or no-signal intensity, and particularly to increase the intensity of said beam from said rest intensity, set by the voltage of source 23 during the writing operation, in response to the signals to be detected, a source 28 of positive periodic input signals, such as a radar receiver, has its output connected through a condenser 29 to fixed contact 25, and thereby also to grid 2 when gating circuit 27 has the position illustrated. Radar receiver 28 is shown in block form because such a receiver is conventional and is familiar to those skilled in the radar art. The output of receiver 28 is a series of pulses corresponding to those reflected from reflecting objects in space within the field of search of the radar equipment. Since these pulses are reflected wave energy, for each and every particular target, they are periodic, the periodicity of such pulses being the same as that of the pulses transmitted toward such target.

Cathode 6, being connected to the negative end of source 7, the positive end of which is grounded, has a negative potential with respect to ground. The potential of source 7 is quite high, on the order of 1600 volts, for example.

A source 30 of synchronizing voltage pulses serves as a source of radar transmitter pulses. By a connection 31, the synchronizable source 14 of time sweep voltage is triggered by source 30, at the time of each transmitted pulse, to begin a new horizontal sweep of beam 11 across target 17 at the time of each transmitted pulse and synchronously therewith. Therefore, the periodicity of sweeps of the electron beam is equal to the periodicity of the signals from source 28, which signals are the ones to be detected.

Collector screen 22 is connected through a resistor 32 to ground at 33, so that said screen is at ground potential. Opposite ends of load or output resistor 32 are connected to provide the input to a gated output amplifier 34, a direct current blocking condenser 35 being provided in series in one of the leads to amplifier 34. The amplified output of amplifier 34 may be applied to an oscilloscope 36, as shown. Amplifier 34 is normally gated off but is capable of being gated on by a video gate pulse supplied thereto through a connection 37.

The secondary emission ratio of an electron target, whether an insulator or a conductor, depends upon the voltage of the incident electrons. The secondary emission ratio of such a target may be defined as the ratio of the secondary emission current leaving the target to the primary electron current striking the target, and for each material there is a certain value $V_1$ of primary electron voltage which gives for such material a secondary emission ratio of unity. When the voltage of the primary electron beam is less than the value $V_1$, the secondary emission ratio is less than unity and the number of electrons striking the target exceeds the number leaving the target, while, when the voltage of such beam is greater than $V_1$, the secondary emission ratio is greater than unity and the number of electrons leaving the target exceeds the number striking the target.

For explaining the action of the tube, we will disregard the negative potential of the repeller 18 for an instant. The electron beam is of high voltage with respect to ground or with respect to plate 17 if said plate is at ground potential, this high voltage being on the order of 1600 volts, for example. This voltage is substantially greater than the so-called critical voltage $V_1$ defined above, which critical voltage gives a secondary emission ratio of unity for target 17. Therefore, the number of secondary electrons leaving the target 17, from the areas bombarded by the electron beam 11, is in excess of the number of primary electrons striking said target in such areas. Since more secondary electrons are leaving the target than are striking it, a net positive charge or voltage tends to be produced on plate 17 in the areas bombarded by the electron beam 11.

If the intensity of the beam is made sufficiently high, with a given sweep or writing speed, an equilibrium potential is produced in a single sweep throughout the areas of the storage plate bombarded by the main electron beam. Such an equilibrium condition results from the following action. As the surface of plate 17 builds up a positive potential, due to the secondary emission ratio being greater than unity, as described above, the positive charge on this plate tends to attract the secondary electrons back to the plate, since such electrons have a rather slow velocity. This retarding or attracting effect on the secondary electrons increases as the voltage of plate 17 becomes more positive, until a point is reached at which the number of secondary electrons which succeed in escaping the retarding or attracting voltage of plate 17, and which therefore leave said plate, equals the number of primary electrons striking the plate, giving a zero net target current at this equilibrium point. When this equilibrium potential has been reached throughout the trace or throughout the area of the storage plate bombarded by the electron beam, such trace or area may be termed "saturated."

It has been found that this equilibrium condition or saturation is reached when the potential of plate 17 is on the order of two volts positive with respect to screen 22 or ground. An equilibrium condition or saturated trace will leave the storage surface 17 covered with an area of discrete charges at equilibrium potential, or having a predetermined value of potential with respect to ground, on the order of two volts positive, for example. For a somewhat more detailed explanation of the above action, reference may be had to my aforesaid copending application.

The above explanation has assumed an electron beam intensity sufficiently high to produce this equilibrium potential or saturation of the trace in a single sweep at a given writing speed. If the intensity of the electron beam is not this high, the trace does not reach the saturation value or the equilibrium potential in a single sweep at such writing speed, because in this case there are insufficient electrons in the beam to make the voltage of the storage plate go sufficiently positive for equilibrium in a single sweep at a given speed of travel thereacross. Under these conditions, more than one sweep is necessary to produce a saturated trace. Variations in electron beam intensity cause corresponding variations in potential level of the target surface, because of the corresponding variations in electron density. According to this invention, the beam intensity is reduced to a value such that the beam writes a trace on the storage plate far below the saturation value in a single sweep, as will more clearly appear hereinafter.

During operation of the storage tube, the repeller 18, and thereby the whole storage plate 17, is raised to a high negative potential by means of potential source 20. Although in Fig. 1 several sources of potential are shown in the form of batteries, the usual practice is to provide these potentials from a source of suitably-rectified alternating current.

The potential of the storage plate 17 and repeller 18 relative to the potential of cathode 6 will determine the speed of the electrons striking the storage surface 17. In the example given, the voltage of the repeller 18 may be 1000 volts negative with respect to ground, while the voltage of cathode 6 may be 1600 volts negative with respect to ground, so that a difference of potential of 600 volts exists between cathode 6 and plate 17, cathode 6 being 600 volts negative with respect to plate 17. This voltage difference is substantially greater than the so-called critical voltage $V_1$ defined above, which critical voltage gives a secondary emission ratio of unity for target 17; therefore, more secondaries are leaving than are arriving at the point of incidence of the electron beam on the storage surface. Since this is so, the trace when saturated will still be slightly positive with respect to the potential of the collector 22, due to the above-explained action, so that for saturation the charge of the trace changes from the original unbombarded 1000 volts negative with respect to ground to two volts positive with respect to ground. For saturation, the beam trace produces an area on surface 17 throughout which the potential is uniform and predetermined, said potential being greatly different from the potential of those areas not bombarded by the electron beam because the areas not so bombarded remain at the negative 1000 volts potential (with respect to ground) applied to storage surface 17 by means of repeller 18 and potential source 20.

By biasing the storage surface 17 to a potential level which is substantially different from the predetermined equilibrium potential value or saturation potential value, I am able to pick up or detect periodically-recurring weak or sub-noise signals. This may be seen more clearly from a consideration of Fig. 2. This figure is a plot of various potential levels in the storage tube, the zero potential level being assumed to be ground or the potential of electrode 22, as indicated by the ground symbol and the horizontal line labeled "collector electrode." The cathode 6 has a potential of 1600 volts negative, as indicated by the horizontal line labeled "cathode." The storage surface 17 and repeller 18 have a potential of 1000 volts negative, as indicated by the horizontal line labeled "repeller and storage surface." It should be apparent, from a consideration of the above discussion, that the beam-bombarded portion of the target or storage surface tends to charge positively with respect to the −1000 volts bias potential level toward the saturation potential level, which is two volts positive, since the net voltage of the electron beam is greater than the critical voltage $V_1$ previously defined. For purposes of clarity, the two volts difference between ground and the saturation potential level is exaggerated in Fig. 2.

It may be seen, in Fig. 2, that there is a substantial difference of potential between the saturation potential level and the storage surface bias potential level, this potential difference being on the order of 1000 volts. During recording or writing on the storage plate, the connections of the gating circuit are as illustrated in Fig. 1. According to this invention, due to the application of a negative potential by means of source 23 to control grid 2 during writing, the intensity of the electron beam is reduced to a value far below that necessary or required to bring the beam-bombarded portions of target 17 to the predetermined equilibrium potential value or the saturation potential level during a single sweep of said beam thereacross. Therefore, in operation, the potential conditions along the bombarded portion of the target at the end of a single sweep may be as indicated in Fig. 2, with the signal potential level for one sweep and the noise potential level for one sweep both being somewhat positive with respect to the −1000 volts bias potential level but still substantially below the saturation potential level. It is desired to be pointed out that the signal potential level for one sweep is below the noise potential level for one sweep; in other words, the signal to be detected is below the noise level or is a sub-noise signal. Because of this very low writing electron beam intensity, a plurality of sweeps of the electron beam across the storage surface are required to cause the potential of the bombarded portion of the target, under any circumstances, to approach the saturation potential level.

It will be recalled that the signals to be detected occur periodically, with the periodicity of the signals being equal to the periodicity of the repetitive sweeps. Therefore, the signal repeats or occurs at exactly the same point on each sweep of the electron beam across the storage surface. Noise, on the other hand, is a random or non-periodic disturbance, so that such disturbance does not repeat at exactly the same point on each such sweep. Therefore, when successive sweeps are added to each other, it becomes possible to sum up the periodic signal at a faster rate than the random noise.

By the storage tube of this invention, successive sweeps or traces are stored and summed up. By applying the positive signal to be detected, and also the inherent noise, to the control grid 2 of the storage tube to increase the intensity of the electron beam 11 as compared to the rest or no-signal intensity of said beam, the successive sweeps produce areas of varying potential, the potentials varying in accordance with the instantaneous electron beam intensity responsive to the signals applied to grid 2. This intensity modulation of the electron beam produces a pattern of varying potentials in the bombarded area of the target surface.

Since the radar echo signal is periodic and repeats at exactly the same point in each sweep, and since the noise is random or aperiodic, the sub-noise signal is summed up at a faster rate than the noise, and the potential conditions along the bombarded portion of the target after a plurality of sweeps, for example, ten, may be as indicated in Fig. 2. At the end of ten sweeps, the signal potential level may have the value indicated by the corresponding legend, while the noise potential level D may have the value indicated by the corresponding legend. Since the signal sums up at a faster rate than does the noise, and since signal-produced increases in electron beam intensity cause corresponding increases in potential level of the corresponding points on the target surface over and above the no-signal positive charging of the beam-bombarded portion of the target with respect to its bias potential, the signal potential level is now greater than or above the corresponding noise potential level D as shown. Now, the signal potential level and the noise potential level D are both substantially positive with respect to the −1000 volts bias potential level but still somewhat below the saturation potential level, with the signal potential level substantially above the noise potential level. The summing-up effect of the potential level of the signal-representing point is indicated for each of the ten sweeps.

In Fig. 2, only ten sweeps are represented as being utilized for the signal potential level to approach the saturation potential level. This has been done only in order to simplify the drawings; in practice, a far greater number of sweeps are preferably used. The greater the number of sweeps stored and summed up, the better is the sub-noise visibility. The number of sweeps necessary to reach saturation potential depends on both beam current and writing speed. As an example, with the repeller run at −1000 volts and an electron beam current of $\frac{1}{10}$ microampere, the gain in charge of each individual trace on the storage surface, depending on speed and spot concentration, will be of the order of ten volts. Neglecting leakage, which is justified if the succession of sweeps is rapid, about 100 traces or sweeps would be needed to increase the trace charge to the 1000-volt limit given by the repeller voltage.

The lower portion of Fig. 3 reports the integrated trace on the storage tube surface after the ten sweeps of Fig. 2. In Fig. 3, the different densities of stippling represent the different corresponding densities of positive charges on the storage surface, or the different corresponding positive potential levels thereon. The random noise forms a charged background A which corresponds to the noise potential level D in Fig. 2. A pair of more-highly-positively-charged substantially rectangular areas B and C represent two sub-noise signals which have been brought up above the noise level by the summation operation of this invention.

A means is provided for reading off the completed integrated or summed-up trace of Fig. 3 in a single sweep.

The gating circuit 27 is illustrated, for purposes of simplicity, as being a controllable switch having a movable contact 26 cooperating selectively with one of a pair of fixed contacts 25 and 39. The movable contact 26 is indicated as being controlled by a step and gate generator 40. Step and gate generator 40 is controlled, in turn, from the impulse source 30 and functions to produce an output pulse in response to a predetermined number of input pulses from source 30. This output pulse of generator 40 has a duration which is equal to the time duration of a single sweep cycle of source 14, and occurs during what may be called a "reading sweep" of electron beam 11.

By connection 37, the output pulse of generator 40 gates on the amplifier 34 during this reading sweep; it will be recalled that this amplifier is off except when so gated on.

Gating circuit 27 is preferably electronic, and said circuit is also gated by generator 40. During the writing or recording process, during which the trace on storage plate 17 is being integrated or summed up as above described, circuit 27 is not gated, so that contact 26 is on contact 25 to connect signal source 28 to grid 2 and to bias said grid negatively by source 23 to reduce the beam intensity so that the beam writes a trace far below the saturation value, as previously described. The normal engagement of contact 26 with contact 25 is indicated by a spring 41 which biases contact 26 toward contact 25.

When generator 40 produces an output pulse, circuit 27 is gated during said pulse to connect contact 26 to contact 39 during the time of this pulse (or during the time of the reading sweep) and after the end of this pulse contact 26 again is connected to contact 25. A potential source 38 has its negative side connected to cathode 6 and its positive side to contact 39, so that, when contact 26 is on contact 39, a positive potential is applied to control grid 2 of storage tube 1. This positive potential on grid 2 produces a rather high-intensity electron beam 11, the intensity being sufficiently high to bring the entire trace up to the predetermined equilibrium potential or saturation potential in the single reading sweep during which said positive potential is applied to grid 2.

It is intended to so operate the system of this invention that, after a predetermined number of sweeps, as shown in Fig. 2, the signal potential level will be substantially above the noise potential level, substantially above the −1000 volts bias potential of the storage plate, will be near to the saturation potential level, but yet will be somewhat below the saturation potential level. For any chosen predetermined number of sweeps, these conditions may be met by properly choosing the electron beam current or beam intensity.

The predetermined number of sweeps, in response to which gate generator 40 produces an output pulse, is made equal to the said chosen predetermined number of sweeps defined in the preceding paragraph. For Fig. 2, this would be ten, and for the other example given above it would be 100. After this number of sweeps, during which the low-intensity beam is integrating or summing up the same number of traces in order to bring sub-noise periodic signals up above the noise level, in the manner described above, gate generator 40 produces a pulse during the next or reading sweep to operate gating circuit 27 and to gate on amplifier 34 during said reading sweep. Amplifier 34 is gated off during the time of recording or summing up the traces. The disconnection of contact 26 from contact 25 disconnects the signal source 28 and the negative bias source 23 from the control grid 2 during this sweep, and the connection of contact 26 to contact 39 connects the positive bias source 38 to said control grid during this sweep.

During this reading sweep, therefore, the entire beam-bombarded portion of the target is brought up to the saturation potential level. During said sweep, different voltage changes will be produced on different elemental areas of the trace, the voltage change produced for any elemental area being the difference between the potential of such area at the end of the writing sweeps and the saturation potential, which is two volts positive. The higher the voltage level is for any particular area before the reading sweep, the smaller will be the output signal voltage for that area. Therefore, the sense of the output signal will be reversed as compared to the input signal. However, this reversal may be compensated for by having the proper number of amplifying stages in amplifier 34.

Collector electrode 22 is capacitively coupled to storage plate 17. Dielectric displacement, caused by the change of potential of the trace on plate 17 to the saturation potential level during the reading sweep in the manner explained previously, is transferred through interelectrode capacitances to collector 22. This produces a positive net collector signal or output voltage which is varying and which is amplified by amplifier 34, since said amplifier is gated on during the reading sweep. Reference may be had to my aforesaid copending application for a more detailed explanation of the output operation.

Now referring to Fig. 3, the curve E represents the output to the indicator 36 during the reading sweep. When the reading beam encounters areas A of low positive potential in the integrated trace, a minimum voltage is produced in the output (assuming a 180° phase reversal in amplifier 34), since here a maximum voltage change is produced by the process of bringing such areas up to the saturation potential level by means of the reading electron beam. When the beam encounters areas B and C of substantially higher positive potential in the integrated trace, which areas result from sub-noise periodic signals, corresponding high-amplitude voltage pulses F and G are produced in the output, since here minimum voltage changes are produced by the process of bringing such areas up to the saturation potential level by means of the reading electron beam.

After the reading sweep, the saturation potential level of the trace may be wiped off the storage surface 17 in the usual manner by any suitable means (not shown). A suitable means for so wiping off the trace is disclosed in my copending application, Ser. No. 1,638, filed January 10, 1948. This means for sweeping off the trace comprises a flood gun structure designated generally by the numeral 50. Structure 50 consists of an electron-emissive cathode 51 which is capable of projecting a broad beam 52 of electrons through a control grid 53 and a foraminous anode 54 toward and to storage plate 17 on which an electron beam 11 impinges. Cathode 51 is connected to the negative end of a suitable source 55 of direct voltage, for example a battery, the positive end of which is connected to ground, so that the flood gun cathode has a negative potential with respect to ground. The voltage of the battery 55 is $V_f$, which is less than the voltage $V_1$, the unit secondary emission ratio voltage for the target 17, which gives for the material of the electron target 29 a secondary emission ratio of less than unity. The flood gun anode 54 is connected to ground at 56, so that when the flood gun is turned on, the entire storage surface 17 will be flooded with electron beam 52 whose voltage is less than the voltage $V_1$ defined above. The flood gun control grid 53 is connected through a resistor 57 to the negative terminal of a biasing battery 58, the positive terminal of which is connected to the cathode 51. The voltage of battery 58 is such that grid 53 is normally biased to cutoff, so that beam 52 is normally cut off, but may be flashed on by applying an impulse of the proper amplitude and polarity to grid 53 by means of a lead 59 connected to said grid through a D. C. blocking condenser 62. Under the above-described voltage conditions, when the electron beam 52 strikes target 17, a negative charge is accumulated over the entire surface of the target, and a condition of equilibrium is finally reached at which the entire surface 17 is brought to a common potential. The beam current required to erase the storage surface charge, or to bring the entire surface to a common potential, depends on the length of the flood gun beam pulse, the voltage $V_f$, and the capacitance between the storage surface 17 and the screen 22.

A plurality of sweeps must be stored and summed up in order to selectively bring the sub-noise periodic signals up above the noise level. Therefore, the useful increase of sensitivity of the radar set below the noise level is accomplished at the expense of speed of information, since the sweep impulses are transmitted to the indicator only at a rate of one impulse to the indicator for every ten or every 100 impulses transmitted from the radar transmitter.

The above completes the description of this invention. It is to be noted that the selective amplification of sub-noise level signals by a storage tube according to this invention is made possible by two concepts, acting singly or in combination. One concept is the use of a repeller electrode, by means of which a bias may be placed on the storage surface, said bias being substantially different from the saturation potential level, whereby a large number of sweeps of the electron beam across the storage surface may be effectuated before the trace approaches the saturation potential level. The other concept is the use of a very-low-intensity electron beam for writing, said intensity being so low that with a given writing speed a trace far below the saturation potential level is written on the storage surface with a single sweep thereacross, whereby a plurality of sweeps are required to bring the trace up to saturation or to a point near saturation.

Of course, it is to be understood that this invention is not limited to the particular details as described above, as many equivalents will suggest themselves to those skilled in the art. It is accordingly desired that the appended claims be given a broad interpretation commensurate with the scope of this invention within the art.

What is claimed is:

1. An electron discharge tube circuit comprising an electron gun for projecting a beam of electrons, a potential storing target surface in the path of projection of said beam, means for applying a negative potential to said surface to initially bias the same, means repetitively sweeping said beam across said surface at a predetermined speed, means for producing an electron beam voltage with respect to the bias potential of said surface in the region necessary to give a secondary emission ratio greater than unity for said target so that the beam bombarded portion of said target tends to charge positively with respect to said bias potential toward a predetermined equilibrium potential value substantially different from said bias potential, means for controlling the writing intensity of said beam to a value substantially below that required to bring the potential of said bombarded portion to said equilibrium value in a single sweep thereacross, whereby a predetermined number more than one of such sweeps are required to cause the potential of said bombarded portion to approach said equilibrium value, means effective after said predetermined number of sweeps for sweeping a high intensity reading electron beam across said surface to bring the potential of all of said bombarded portion to said equilibrium value during said last-named single sweep, and means responsive to the secondary emission of electrons produced by the high intensity reading electron beam for producing an output signal.

2. An electron discharge tube circuit comprising an electron gun for projecting a beam of electrons, a potential storing target surface in the path of projection of said beam, means for applying a negative potential to said surface to initially bias the same, means repetitively sweeping said beam across said surface at a predetermined speed, means for producing an electron beam voltage with respect to the bias potential of said surface in the region necessary to give a secondary emission ratio greater than unity for said target so that the beam bombarded portion of said target tends to charge positively with respect to said bias potential toward a predetermined equilibrium potential value substantially different from said bias potential, means for controlling the writing intensity of said beam to a value substantially below that required to bring the potential of said bombarded portion to said equilibrium value in a single sweep thereacross, whereby a predetermined number more than one of such sweeps are required to cause the potential of said bombarded portion to approach said equilibrium value, means effective after said predetermined number of sweeps for sweeping a high intensity reading electron beam across said surface to bring the potential of all of said bombarded portion to said equilibrium value during said last-named single sweep, and a grid positioned adjacent said surface for collecting secondary emission electrons produced by the high intensity reading electron beam, said grid having a signal output load coupled thereto.

3. An electron discharge tube circuit comprising an electron gun for projecting a beam of electrons, a potential storing target surface in the path of projection of said beam, means for applying a negative potential to said surface to initially bias the same, means repetitively sweeping said beam across said surface at a predetermined speed, means for producing an electron beam voltage with respect to the bias potential of said surface in the region necessary to give a secondary emission ratio greater than unity for said target so that the beam bombarded portion of said target tends to charge positively with respect to said bias potential toward a predetermined equilibrium potential value substantially different from said bias potential, means for controlling the writing intensity of said beam to a value substantially below that required to bring the potential of said bombarded portion to said equilibrium value in a single sweep thereacross, whereby a predetermined number more than one of such sweeps are required to cause the potential of said bombarded portion to approach said equilibrium value, and means effective after said predetermined number of sweeps for sweeping a high intensity reading electron beam across said surface to bring the potential of all of said bombarded portion to said equilibrium value during said last-named single sweep, said means for applying a negative potential to said surface comprising means for restoring said target surface to its initial bias value following reading of said surface.

4. An electron discharge tube circuit comprising an electron gun for projecting a beam of electrons, a potential storing target surface in the path of projection of said beam, means for applying a negative potential to said surface to initially bias the same, means repetitively sweeping said beam across said surface at a predetermined speed, means for producing an electron beam voltage with respect to the bias potential of said surface in the region necessary to give a secondary emission ratio greater than unity for said target so that the beam bombarded portion of said target tends to charge positively with respect to said bias potential toward a predetermined equilibrium potential value substantially different from said bias potential, means for controlling the writing intensity of said beam to a value substantially below that required to bring the potential of said bombarded portion to said equilibrium value in a single sweep thereacross, whereby a predetermined number more than one of such sweeps are required to cause the potential of said bombarded portion to approach said equilibrium value, and means effective after said predetermined number of sweeps for sweeping a high intensity reading electron beam across said surface to bring the potential of all of said bombarded portion to said equilibrium value during said last-named single sweep, said means for applying a negative potential to said surface comprising a flood gun for restoring said target surface to its initial bias value following reading of said surface.

5. An electron discharge tube circuit comprising an electron gun for projecting a beam of electrons, a potential storing target surface in the path of projection of said beam, means for applying a negative potential to said surface to initially bias the same, means repetitively sweeping said beam across said surface at a predetermined speed, means for producing an electron beam voltage with respect to the bias potential of said surface in the region necessary to give a secondary emission ratio greater than unity for said target so that the beam bombarded portion of said target tends to charge positively with respect to said bias potential toward a predetermined equilibrium potential value substantially different from said bias potential, means for controlling the writing intensity of said beam to a value substantially below that required to bring the potential of said bombarded portion to said equilibrium value in a single sweep thereacross, whereby a predetermined number more than one of such sweeps are required to cause the potential of said bombarded portion to approach said equilibrium value, and means effective after said predetermined number of sweeps for sweeping a high intensity reading electron beam across said surface to bring the potential of all of said bombarded portion to said equilibrium value during said last-named single sweep, said means for applying a negative potential to said surface comprising a flood gun biased below the secondary emission ratio of said surface for restoring said target surface to its initial bias value following reading of said surface.

References Cited in the file of this patent

UNITED STATES PATENTS

| Number | Name | Date |
|---|---|---|
| 2,280,191 | Hergenrother | Apr. 21, 1942 |
| 2,410,233 | Percival | Oct. 29, 1946 |
| 2,430,038 | Wertz | Nov. 4, 1947 |
| 2,451,005 | Weimer et al. | Oct. 12, 1948 |
| 2,459,319 | Hansell | Jan. 18, 1949 |
| 2,508,408 | Liebson | May 23, 1950 |
| 2,524,837 | Russell et al. | Oct. 10, 1950 |
| 2,563,500 | Snyder, Jr. | Aug. 7, 1951 |